UNITED STATES PATENT OFFICE 2,084,276

MANUFACTURE OF CEMENTITIOUS INSULATING COMPOSITIONS FROM VERMICULITE

Paul S. Denning, Joliet, Ill., assignor to F. E. Schundler & Company, Inc., Joliet, Ill., a corporation of Illinois, and to The Illinois Clay Products Company, Joliet, Ill., a corporation of Illinois No Drawing. Application April 2, 1935, Serial No. 14,276

5 Claims. (Cl. 106—18)

This invention relates to the manufacture of products containing exfoliated vermiculite and the like and particularly to its refinement or purification for use in such products. Among other objects, the invention aims to provide a simple and efficient process for effecting the separation or elimination of foreign matter from the vermiculite.

The nature of the invention may be readily understood by reference to the hereinafter described method embodying the invention.

Exfoliated vermiculite is an alteration product of certain micaceous minerals, such as biotite, which exfoliate or expand to many times their original size upon the application of heat, to produce a granular material which is extremely light in weight (about six pounds per cubic foot) and having excellent insulating and refractory properties.

Even though in some deposits there is only a small percentage of impurities, the vermiculite is never entirely pure, the percentages of foreign matter, such as feldspar, varying with the location of the deposit. The impurities are not only objectionable since they increase the weight of the material and reduce its insulating efficiency, but at high temperatures they act as a flux and impair the value of the exfoliated vermiculite as a refractory.

While the rock or other impurities, all of which are much heavier than the particles of exfoliated vermiculite, can be separated by floating the exfoliated vermiculite on water, allowing the heavy impurities to sink, this process is not used in practice since the vermiculite will take up and hold about 300% of its weight of water, most of which is fairly firmly held by capillarity in the minute spaces between the cleavage planes. It is difficult to remove the water and, unless it be removed, the exfoliated vermiculite is not in condition for use particularly with cements or binders by which the particles are bound into a coherent molded or other mass. The water thus held in the exfoliated vermiculite would so dilute the binding material as seriously to impair its binding efficiency. The use of a larger proportion than necessary of binding material merely to absorb the water carried in the vermiculite would not only involve additional cost but the resultant product would be quite dense and of little value as an insulation. For the foregoing reasons and also because it is desirable to employ a minimum of binding material consistent with adequate strength (to insure maximum insulating efficiency), it is impractical to purify the exfoliated vermiculite by floating it upon water.

I have discovered that the exfoliated vermiculite may be purified by floating without encountering the foregoing disadvantages. According to the present invention, the vermiculite is purified by floating it upon its binder or the liquid constituent thereof. For example, if the binding material be magnesium oxysulphate cement, the exfoliated vermiculite is purified by floating it upon the magnesium sulphate solution which is employed to react with the magnesium oxide to form the magnesium oxysulphate cement. Preferably a magnesium sulphate solution having a concentration of about 28° Baumé is employed.

If the binder be in liquid form, such as pitch liquor or sodium silicate, the exfoliated vermiculite is purified by floating the same on the liquid in the condition in which it is used as a binder. The foregoing examples will suffice to indicate the application of the principle of the invention for other binders. It will be understood that the process of purification is little more than one of the steps necessary in mixing together the various ingredients comprising the final product and therefore does not involve the additional cost incident to purification by a method which is wholly independent of the compounding of such ingredients.

After floating, it is desirable to remove excess or free liquid. This can be most conveniently done simply by allowing the treated exfoliated vermiculite to drain for a short period of time. It is then desirable to determine how much binder or its liquid remains in the exfoliated vermiculite. This can be most conveniently determined by observing the difference in weight between a quantity of dry purified exfoliated vermiculite (i. e., minus the rock and the like) and the weight of the same quantity after its contact with the floating liquid. This data which need be obtained only once for a given character of exfoliated vermiculite and a given type of liquid, will enable one to determine how much, if any, binder liquid must be added to the purified exfoliated vermiculite to provide the proper amount of binder or its liquid constituent.

Thereupon the necessary additional liquid, if any, is added and the material prepared for molding or other use by adding and mixing in other ingredients, such for example as magnesium oxide if the binding cement is to be magnesium oxysulphate cement. Frequently a small percentage of clay or other similar material is added.

The resultant material will have maximum insulating efficiency since rock and other impurities have been removed and the process of compounding has made it possible (where maximum insulation is desired) to employ only the minimum amount of binder to form an adequate bond.

Obviously the invention is not limited to the details of the illustrative material since these may be variously modified.

Having described my invention, I claim:

1. The method of making a cementitious insulating material which is characterized by exfoliating granules of vermiculite and then floating the exfoliated granules upon a solution of magnesium sulphate to allow heavy impurities to sink, skimming off the floating vermiculite granules, draining off excess solution from the granules, then adding magnesium oxide and enough additional magnesium sulphate solution to bring the total magnesium sulphate solution including that adhering to said granules to such proportion relative to the magnesium oxide to form magnesium oxysulphate cement, then mixing all the materials together and molding the same.

2. The method of removing heavy fluxing and other impurities from exfoliated vermiculite used in cementitious insulating refractories which is characterized by exfoliating granules of vermiculite, then floating the exfoliated granules upon the liquid constituent of the binding substance used in the refractory at temperatures substantially below the exfoliating temperature of vermiculite, allowing the fluxing matter and other impurities to sink in said liquid, recovering the floating purified exfoliated vermiculite and mixing it with a predetermined proportion of added binding substance in an amount adjusted to the liquid retained by the vermiculite following its floating treatment, and then molding the resulting cementitious material.

3. The method of increasing the insulating efficiency of a cementitious product containing exfoliated vermiculite which is characterized by exfoliating granules of vermiculite, then floating the exfoliated granules upon the liquid at a temperature substantially below the exfoliating temperature of vermiculite to allow the heavy impurities to sink, said liquid being a constituent of the binding substance used in the cementitious product, skimming off the floating granules, determining the amount of liquid held by the exfoliated vermiculite and adding such additional liquid and other constituents of the binding substance as may be necessary to supplement the liquid held by the vermiculite to provide the proper proportion of binding substance, and then molding the product into the desired form.

4. The method of purifying exfoliated vermiculite used in a cementitious product employing a liquid binder which is characterized by floating granules of exfoliated vermiculite upon the liquid binder whose temperature is substantially below the exfoliating temperature of vermiculite and allowing the heavier impurities to sink, and then mixing the purified exfoliated vermiculite with a predetermined additional amount of the binder to bring the total binder to an amount sufficient to form the cementitious product.

5. The method of making a cementitious insulating material comprising exfoliated vermiculite and a binder made for liquid and solid constituents which is characterized by first floating the particles of exfoliated vermiculite on the liquid constituent of the binder to allow heavy impurities to sink, then adjusting the amount of said liquid in the purified product to the proportion necessary to form a binder with the solid constituent, and then mixing the vermiculite and binder constituents.

PAUL S. DENNING.